Sept. 13, 1960 S. G. MARINOVICH ET AL 2,952,295
APPARATUS AND METHOD FOR BELLING LARGE
DIAMETER PIPE AND TRUING THE SAME
Filed Dec. 31, 1956 4 Sheets-Sheet 1
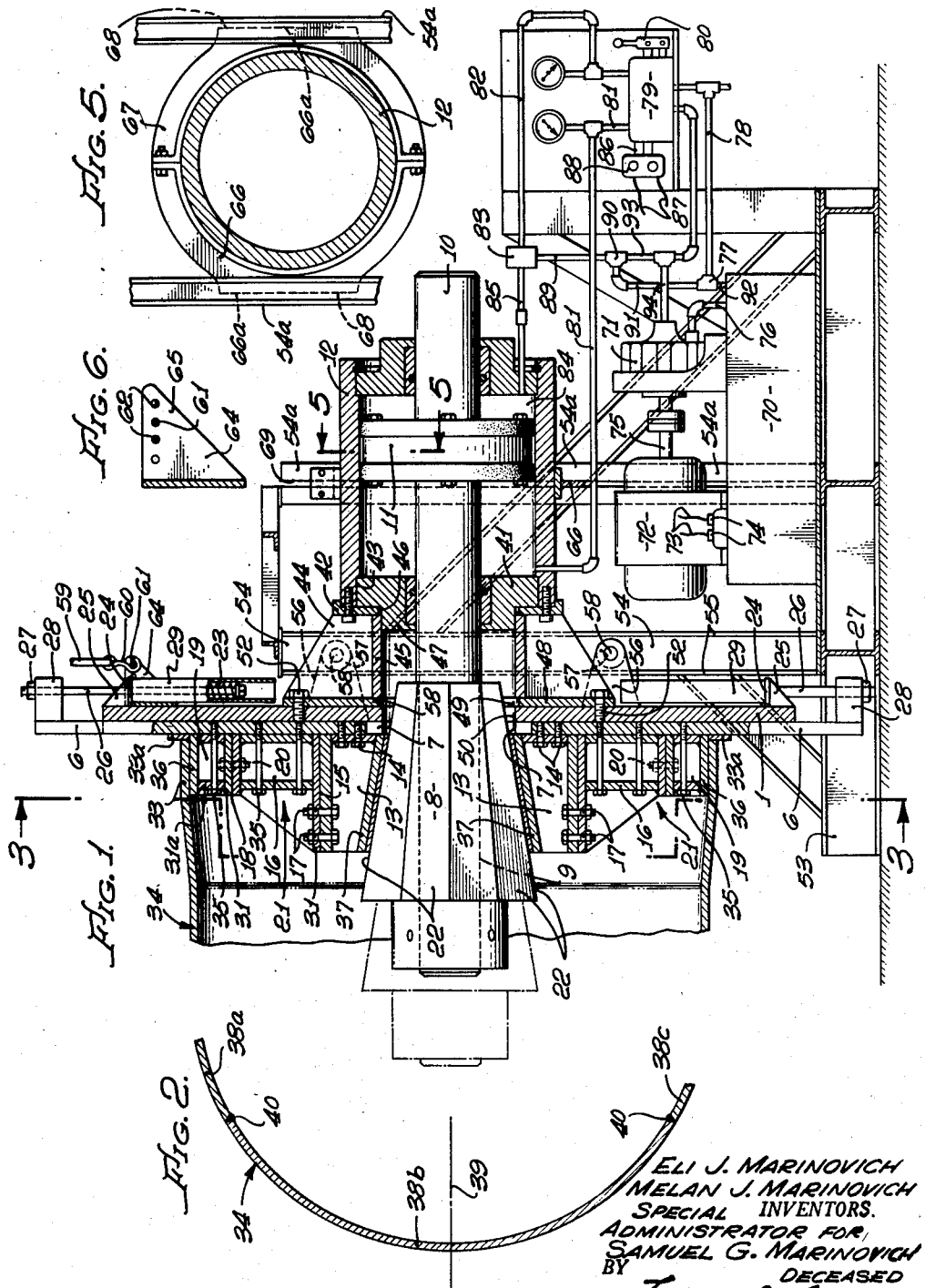
ELI J. MARINOVICH
MELAN J. MARINOVICH
SPECIAL INVENTORS.
ADMINISTRATOR FOR,
SAMUEL G. MARINOVICH
BY DECEASED
ATTORNEY.

Sept. 13, 1960  S. G. MARINOVICH ET AL  2,952,295
APPARATUS AND METHOD FOR BELLING LARGE
DIAMETER PIPE AND TRUING THE SAME
Filed Dec. 31, 1956  4 Sheets-Sheet 2

ELI J. MARINOVICH
MELAN J. MARINOVICH
SPECIAL
ADMINISTRATOR FOR INVENTORS.
SAMUEL G. MARINOVICH
BY DECEASED

ATTORNEY.

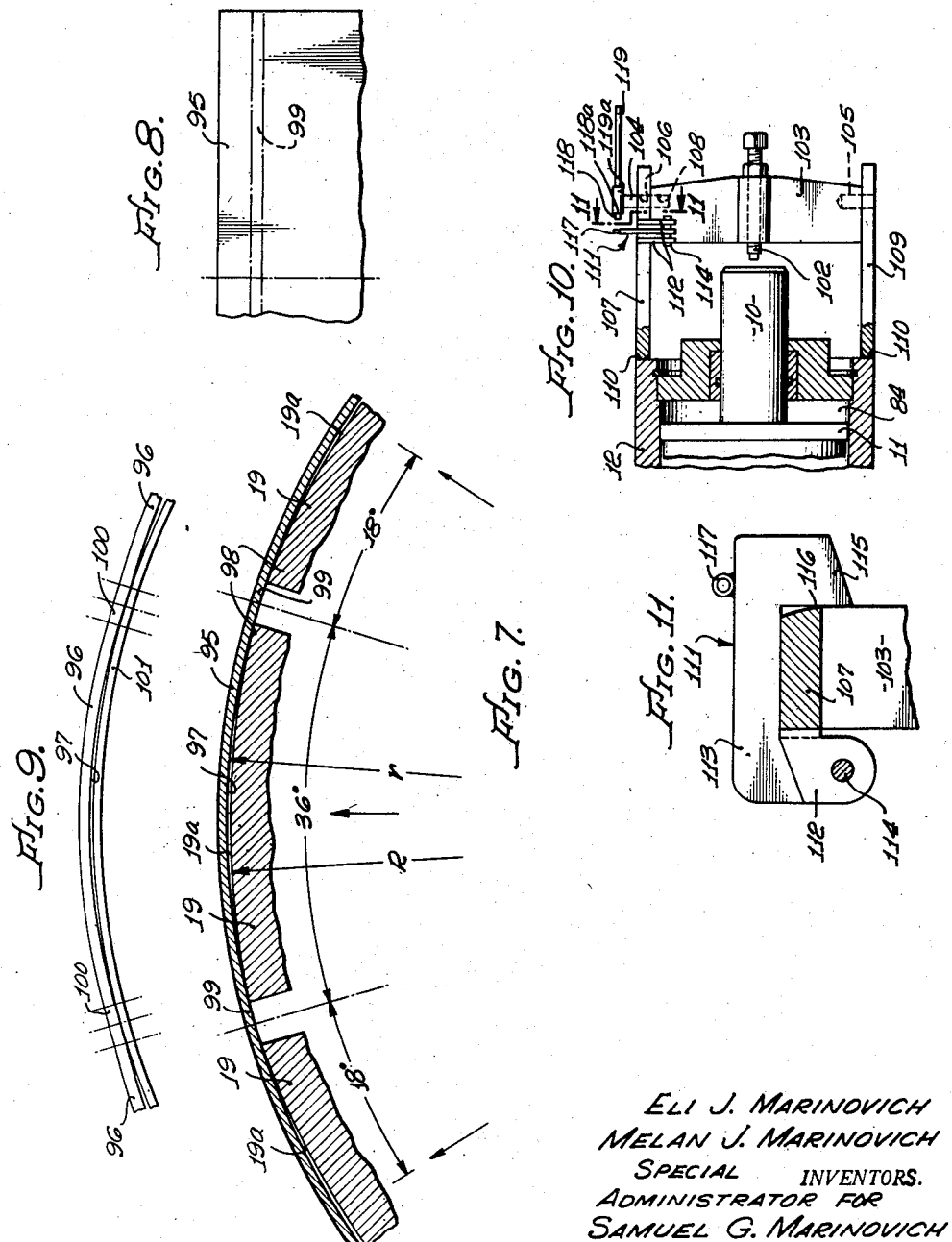

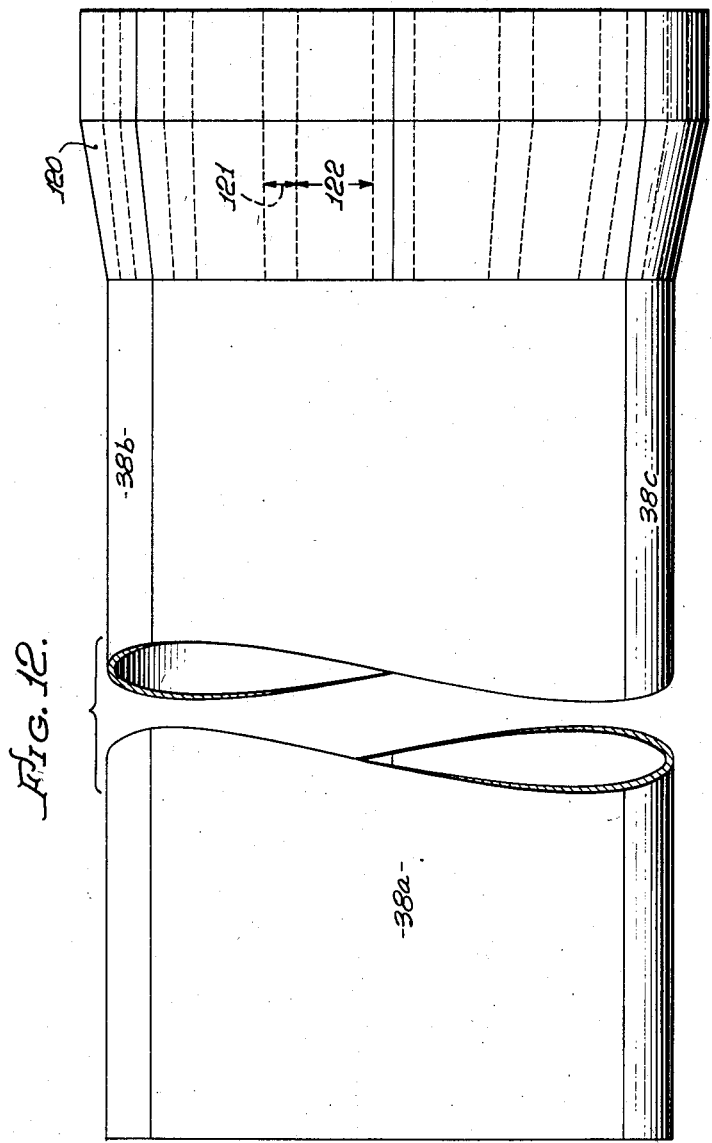

United States Patent Office 2,952,295
Patented Sept. 13, 1960

2,952,295

APPARATUS AND METHOD FOR BELLING LARGE DIAMETER PIPE AND TRUING THE SAME

Samuel G. Marinovich, deceased, late of Los Angeles, Calif., by Melan J. Marinovich, administrator, Los Angeles, Calif., and Eli J. Marinovich, Temple City, Calif., assignors, by mesne assignments, to Yuba Consolidated Industries, Inc., San Francisco, Calif.

Filed Dec. 31, 1956, Ser. No. 631,582

8 Claims. (Cl. 153—80)

This invention relates to the processing of metallic pipe-lengths to be used in laying pipe lines or the like. While the invention may be applied to pipe of any diameter, it is especially useful in solving problems arising in the production of pipe to be used in conduits of such a large diameter that the pipe must be fabricated.

One of the difficulties encountered in the manufacture of large diameter pipe, for example, pipe of approximately 6 feet in diameter, or thereabouts, is that such pipe will be found to be not truly cylindrical. This circumstance make it difficult to lay a pipe line with such pipe due to the fact that the pipe ends are not true to their proper diameter, and are consequently ill adapted for being fitted together, either in a bell and spigot type of connection, or where the pipe ends are connected together by a coupling, or by any type of welding.

Heretofore it has been attempted to true large diameter pipe length by rolling operations. Such practices have been found unsatisfactory, as defects may develop in the pipe lengths particularly where the pipe is fabricated. Fabricated pipe refers to pipe composed of a plurality of curved sections the adjacent edges of which have been welded together by butt welds running longitudinally of the pipe.

One of the objects of this invention is to overcome this difficulty and to provide a form for the mouth of the pipe bell that will facilitate centering the adjacent spigot within the bell when the pipe lengths or sections are being laid.

Another object is to provide a predetermined clearance around the perimeter of the spigot to facilitate the welding operation which completes the joint.

Another object of this invention is to provide apparatus and a procedure that will insure the proper centering of a spigot when it is received in an adjacent bell.

Further objects of this invention will be evident from a careful reading of the following specification, and study of the accompanying drawing.

A preferred embodiment of the invention is described in this specification, while the broad scope of the invention is pointed out in the appended claims.

In the drawing:

Figure 1 is a vertical section through apparatus that is employed to form a bell at one end of a pipe-length of large diameter a portion of the pipe being broken away.

Figure 2 is a fragmentary section of a fabricated pipe of large diameter, composed of welded pipe sections.

Figure 5 is a fragmentary sectional view, showing in elevation, a detail of a circular frame part for supporting a hydraulic cylinder that is illustrated in Figure 1. This section is taken on line 5—5 of Figure 1.

Figure 6 is a fragmentary vertical section through a bracket shown in Figure 1, to cooperate with a hook from a hoist for lifting the apparatus shown in Figure 1.

Figure 7 is a fragmentary vertical section through the outer ends of the slips or expanding shoes shown in Figures 1 and 3, illustrating a preferred step that may be employed in this invention when it is desired to stretch the material of the pipe at the bell in areas separated by relatively flat areas at the gaps between the expanders.

Figure 8 is also a fragmentary view of a diagrammatic nature further illustrating the practice of the invention. This view is an elevation of the pipe shell shown in Figure 7 as viewed from the right.

Figure 9 is also a fragmentary view further illustrating how the method employed in practicing the invention results in effecting a true diameter bell to enable substantially perfect centering of the spigot within the bell.

Figure 10 is a vertical section through the end of the power cylinder for actuating the belling apparatus, and illustrating means for cooperating with its plunger for setting an adjustable stop for arresting the operation of the belling slips.

Figure 11 is a vertical cross-section on the line 11—11 of Figure 10, and on a larger scale further illustrating a latch shown in Figure 10.

Figure 12 is a side elevation of a pipe formed by the apparatus of the invention.

Figure 3:
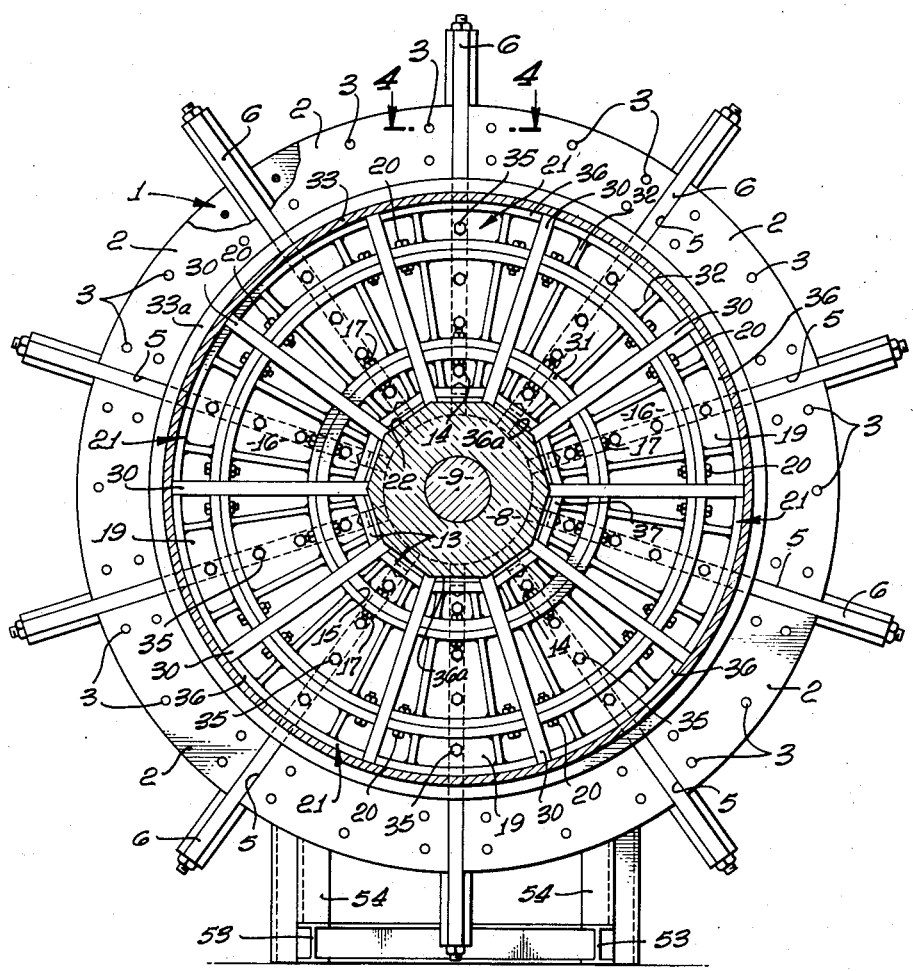
Figure 3 is a vertical cross-section taken on the broken line 3—3 of Figure 1.
Figure 4:
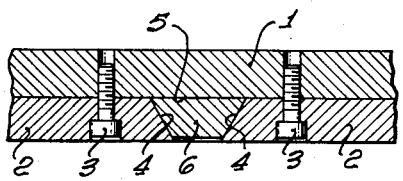
Figure 4 is a horizontal cross-section upon an enlarged scale on the line 4—4 of Figure 3 to show a detail in the preferred construction.

This machine preferably has an upright circular faceplate 1 on the forward face of which a plurality of segmental substantially triangular guide plates 2 are attached by machine screws or bolts 3. These segmental plates 2 have beveled side edges 4 which cooperate to form dove-tail radial grooves 5 for guiding radial bars 6. The inner ends 7 of these bars extend radially inward to a point near the flat side faces of a driver-cone 8 which is attached to a neck 9 extending from a plunger in the form of a piston rod 10 that can be moved in either direction by its piston 11 mounted in a power cylinder 12.

Each bar 6 carries a relatively small driver shoe 13 attached to it by bolts 14. The radially outer face 15 (radially) of the driver shoe 13 is in the form of an arc against which rests a spacer segment or shoe carriage 16 attached to the face 15 by two bolts 17.

Upon the outer face 18 of each spacer segment 16 a presser-shoe 19 is attached by bolts 20. The connected driver shoe 13, spacer segment 16 and presser shoe 19 constitute a slip 21. The instantaneous position of the various slips 21 with relation to the axis of the neck 9 depends upon the position in which the driver cone 8 is located for the moment.

The slips 21 operate with their inner ends in contact with the inclined side faces 22 of the driver cone 8. The slips 21 are held there normally, and returned to their innermost position by coil springs 23, respectively, the outer ends of which thrust against the inner ends 24 of brackets 25. The brackets are attached to the rear side of the faceplate 1. Through these brackets stems 26 pass, the threaded outer ends of which carry adjusting nuts 27 that seat upon lugs 28 projecting rearwardly from the radially outer ends of the bars 6.

Tubular housings 29 are provided for the springs 23. In the innermost position of the slips 21 their side edges may rest substantially against a plurality of radial ribs 30 on the faceplate 1.

All of the individual members 16 and 19 comprised in the slips 21 have flanges 31 at their inner edges. The presser shoes 19 have walls 31a providing outer faces. The flanges 31 are preferably reinforced by radial ribs 32, to strengthen the members and adapt them for imparting relatively great radial stresses to the material forming the end portion 33 of the mouth of a pipe-length 34 when it is engaged by the arcuate outer faces of the presser shoes 19.

All three of the members 13, 16, and 19 are secured to their corresponding radial bars 6 by suitable bolts 35. The outer portion of each presser shoe 19 has an arcuate faceplate 36, receivable between the ribs 30 in one position of the slip 21.

As shown in Figure 3, the driver cone 8 may have many side faces 36a. They are inclined longitudinally, and against them the inclined inner walls 37 of the driver shoes 13 rest.

In Figure 2 of the drawing we illustrate a portion of a cross-section through a fabricated pipe which is assumed to be a pipe of such large diameter that it is necessary to fabricate the same by forming it of sections three in number; in which case the pipe comprises a plurality of rectangular plates, 38a, 38b, and 38c. In reading this view it should be understood that the plates 38a and 38c will have their edges on one side of the pipe welded together in a plane passing through the axis of the pipe and coinciding with the line 39. The character of the butt welds is indicated at 40.

The inner head 41 of the power cylinder 12 has a thick disc-form body with an annular plate 42 that overlaps the edge of the head 41 and is provided with bolts that secure the head in a shallow counterbore 43 in the wall of cylinder 12. Radial webs 44 extend out from the annular plate 42 and from a tubular body 45 leaving a clearance space 46 but overlying the remainder of a reduced extension 47 of the cylinder head 41. The webs 44 are welded to a large annular plate 48 having a central opening 49 registering with an opening 50 in the face plate 1. The plate 48 is fastened to the face plate 1 by bolts 52.

The openings 49 and 50 provide clearance for the movements of the small tapered end of the driver cone 8.

Below the driver cone 8, a base-frame 53 of I-beams and channel iron is provided from which two main posts 54 extend up, one on each side of the power cylinder 12, and adjacent its inner end. These posts 54 are stepped on the base frame 53.

The posts 54 are of I-beam or channel iron so that they present side flanges 55 projecting toward the axis of the piston rod 10.

In order to guide the faceplate 1 on these main posts two plate-form brackets 56 are provided, welded to the adjacent face of the faceplate 1. They are of substantially triangular form and carry rollers 57 respectively mounted on pins 58 that pass through the brackets 56. These rollers 57 may run on either of the two flanges 55 of the channels 54 between which they lie, depending upon whether the weight of the cylinder 12 and attached parts is greater or less than the weight of the faceplate 1, and its attached parts, with respect to the location of an overhead support (Fig. 1). This support includes a depending cable 59, the lower end of which carries a hook 60 engaging a cross pin 61 mounted in any one pair of four pairs of aligned openings or eyes 62. These openings are respectively formed in the two wings 65 (Fig. 6) that are the side plates of a U-shaped bracket 64. This bracket 64 is welded to the adjacent face of the faceplate 1.

In addition to the main posts there are two other guide posts 54a stepped on the base frame 53 and formed of channel iron pairs and disposed respectively on opposite sides of the power cylinder 12 and standing in contact with the vertical side edges of a circumferential ring 66 carried by the wall of the cylinder 12. The band 66 is divided in a vertical plane into two sections bolted to each other, as shown in Figure 5. The body 67 of the ring 66 lies in a vertical plane and has side extensions 68 or flanges that project through slots 69 between the channel iron pairs forming the guide posts 54a for guiding the ring.

Between the lower ends of the posts 54a a pressure tank 70 is located. This is supplied with operating fluid, such as water under pressure from a pump 71 driven by an electric motor 72 receiving current through the circuit wires 73 connected to the motor terminals 74. The pump 71 is coupled to the motor shaft 75 and delivers to the pressure tank 70 through a pipe connection 76.

Pressure fluid from tank 70 is supplied through a T-connection 77 and a pipe 78 to a valve-chest 79 containing a valve (not illustrated), that is controlled by a valve-lever 80. In one position of the lever 80 the operating fluid flows up through a flexible pipe connection 81 to the left end of the power cylinder 12 to move the driver cone 8 towards the right (in Fig. 1), and thereby applies the slips 21 and particularly the presser shoes 19 to the pipe wall.

In another position of the valve-lever 80 the operating fluid is admitted up through a pipe connection 82 to a by-pass chamber 83 that finally delivers the pressure fluid to the right end chamber 84 of the cylinder through a flexible pipe connection 85. This returns the piston 11 to the normal position of rest, forcing the pressure fluid in the left end of the power cylinder 12 to flow back the pipe connection 81 to the valve-chest 79.

When the presser shoes 19 have formed the end portion 33 of the pipe to a sufficient extent, their further movement is arrested by contact with the inner edge of a ring 33a. The ring 33a acting as a stop causes the pressure in the valve-chest to rise, whereupon a safety valve (not illustrated) in the valve-chest pops open, and this closes a circuit through wires 86 and 87 to operate a signal 88 which may be a red-lamp or an electric bell. When this occurs the valve lever 80 should be moved to its neutral position. However, if the valve lever is not moved to its neutral position the excess pressure developed in chamber 84 of the cylinder 12 will now be relieved through the by-pass chamber 83, and the fluid in the chamber 84 will be directed down through pipe 89, T-connection 90, and pipe-connections 91 and 92 back to the tank 70.

A green light signal lamp may be wired to light up when the valve-lever is in an operative position. If the pump 71 is running, the excess pressure in chamber 84 would be relieved down through pipe connections 93 and 94, the latter of which connects to the suction side of the pump.

If desired, the cable 59 may be hung over a heavy sheave or drum, with a counterweight on the cable beyond the drum to facilitate adjusting the face-plate and attached parts up or down on the posts 54 and 54a, and along the slots 69, the flexible pipe connections 81 and 85 maintaining hydraulic connection during this movement.

In order to provide for exerting a beneficial stretching effect and a new disposition of material in a bell formed by means of the presser shoes 19, the working face 19a of each presser shoe is preferably struck on a radius R that is slightly greater than the radius r of the inner face of the pipe on which the bell is being formed. This is illustrated in Figure 7 of the drawing that shows the working face 19a in its initial position to apply pressure to the wall 95 of the pipe end.

When pressure is applied through all of the expanding slips 21, the material of the wall at blisters such as 95 will be deformed into a series of blisters 96 (see Figure 9), and the inner face 97 of each blister will conform substantially to the radius R of the working face 19a that formed it.

In this operation the metal of the pipe at 99 (Figures 7 and 8) between the heels 98 of the pressure shoes 19, due to the tension developed in it, will become more or less flat zones 100 (Figure 9) extending longitudinally of the pipe.

As the radius to the inner face of a zone 100 is less than the radius to the inner face of a blister 96 it will be evident that the inner faces of the flat zones 100 will be the nearest areas to the outer surface of a spigot end 101 of an adjacent pipe put into the bell. Hence, these flat zones will automatically perform the service of centering the spigot in the bell. This, of course, greatly facilitates the operation of welding-in the pipe joints, the end result being a considerable saving in a welder's time and a saving in welding stock consumed, by reason of the reduction of the clearance gap between the surfaces connected by the welds.

It is found in practice also, that the presence of the blisters 96 is advantageous because they predispose the pipe to maintain its true general "cylindrical" though blistered shape.

The practice of subjecting large diameter pipe to circumferential tension in expanding the pipe wall has a beneficial effect on the yield-point of the metal, that is to say, the elastic limit, by raising it approximately ten percent in most cases.

It is one of the objects of this invention to provide the apparatus with means applied at the bell as it is being formed, to limit its diameter. That object is attained in either of two ways. The first way is by employing a ring 33a (see Figure 1) of high tensile strength steel that lies against the forward face of the faceplate 1. The ring operates as a stop to limit the working travel of the slips 21. The second way for attaining that object is illustrated in Figures 10 and 11. In that case stop means is provided in the path of the piston rod 10 that is moved forward and back in the power cylinder 12. An adjustable stop 102 on the axis of the piston rod 10 is mounted in any suitable manner. It is illustrated here as consisting of a long bolt threaded into the middle section of a cross-bar, or bridge 103, and provided on its tail end with a checknut that can be tightened up against its seat to hold the stop fixed in any position to which it has been adjusted.

The bridge 103 is disposed in a vertical plane. The thrust of the piston rod end is resisted by two steel pintles 104 and 105. The pintle 104 is swiveled in a drilled hole 106 in a crown bar 107, and its tip is in a socket 108 in the bridge 103, into which it fits tightly. The pintle 105 is tight in its socket in the base-bar 109, and is a free fit in its seating socket in the lower end of the bridge 103.

The bars 107 and 109 are of fine quality steel with sufficient cross section to take the tension to which they are subjected under load.

They may be secured by butt-welds at 110 to the end face of the power cylinder 12.

In order to forestall any tendency of the bridge 103 to swivel on the pintles 104 and 105, a latch 111 is provided toward the forward edge of the bridge. The latch comprises two spaced ears 112 that may be welded to the side of the crown-bar 107. Between them the shank of a latch plate 113 is pivotally mounted on a through pin 114. A bill 115 at one end of the latch plate has an inner edge which tightens against the lower part of the adjacent edge 116 of the crown bar 107. This edge 116 is relieved along an arc toward its upper end to give clearance for the contact point of the bill as it swings upward to release the latch. The upper edge of the latch behind the bill 115 is provided with an eye 117 welded on, that enables a stout hook and cable to be applied to raise and release the latch. A transversely split eye 118 is welded onto the side of the head 118a of the pintle 104. A socket 119a in the opposite side of the head 118a receives a handle lever 119 for rotating the pintle 104 and the bridge 103 to inactivate the stop 102.

The use of the suspension cable 59 is important because it gives vertical adjustability to the apparatus. This is desirable because pipe to be processed is often of different diameters. The fact that the cable is present also attains another, incidental object by avoiding the necessity for providing heavy frame elements to support the assembly of parts including the presser shoes and the power means that actuates the driver cone.

Many other embodiments of the invention may be resorted to without departing from the spirit of the invention.

We claim as our invention and desire to secure by Letters Patent:

1. In apparatus of the kind described, the combination of framing including a base frame adapted to rest adjacent the floor line, a pair of upright posts spaced apart stepped on, and secured to, the base frame; a second pair of spaced apart upright posts stepped on, and secured to, said base frames; power means located between said first named pair of posts, a faceplate located in a vertical transverse plane forward of the first named pair of posts, carrying said power means and also having a central opening, a plurality of circumferentially spaced presser shoes movably mounted on, and guided radially on, the side of the faceplate remote from said power means, for engaging the inner face of the mouth of a pipe length to press the wall thereof outwardly and develop a bell on the same, said power means having a rod actuated thereby, extending forwardly from the same in line with said opening, a driver cone carried by said rod; intermediate actuating means for the presser shoes, having faces for contacting the driver cone to force said presser shoes outwardly when said power means actuates said driver cone to move the same along its axis, means for suspending said faceplate, and means for guiding said faceplate for vertical movement, to adjust the level at which the faceplate is supported; and control means included in the apparatus for actuating and controlling the driver cone.

2. In apparatus for forming a bell of a predetermined inner diameter at the end of a pipe, the combination of a frame, a planar faceplate having a central axis and mounted on said frame with said axis substantially horizontal, means on said faceplate for supporting and guiding a plurality of slips for movement radially of said axis, a plurality of slips engaging said supporting and guiding means, each of said slips including a removably mounted presser shoe having an arcuate outer face of substantially the radius desired for said predetermined inner diameter of said bell, and a loose ring encompassing said slips and disposed against said faceplate, said ring having said predetermined inner diameter.

3. In apparatus for forming a bell on a pipe end of relatively large diameter, the combination of a frame to stand on a floor, means for mounting said faceplate on said frame for movement constrained to a predetermined vertical plane, means forming guiding grooves in said faceplate, a plurality of slips, means including radial bars disposed in said grooves on the faceplate and attached to said slips for guiding said slips in a radial direction on said faceplates, a driver cone movably supported on the axis of the faceplate, said drive cone having inclined side walls engaging said slips, said slips including shoes having arcuate outer faces struck to substantially the radius of the inside of the bell to be formed, means for shifting said driver cone along said axis to force the shoes outwardly, and cable means connected to the faceplate for moving said faceplate in said vertical plane.

4. Apparatus for forming a bell on a pipe end of relatively large diameter according to claim 3 in which said slips are substantially evenly spaced whereby the outer faces of said shoes when deforming the pipe bell leave gaps of substantially equal width between the adjacent shoes and form a plurality of outwardly projecting blisters spaced apart from each other in the wall of the pipe with substantially flat faces between the blisters.

5. In apparatus for forming a bell on a pipe end of relatively large diameter according to claim 3 in which the means for shifting the driver cone includes a power cylinder with a ring encompassing the cylinder, said ring projecting laterally from the cylinder, the combination of vertically extending guide means located on said frame at the sides of said cylinder for receiving and guiding said ring and the cylinder when the faceplate is raised or lowered by said cable means.

6. In apparatus for forming a bell on a pipe end of relatively large diameter according to claim 5 in which said ring is provided with vertically extending flanges at the opposite sides of the cylinder, and in which the guide means comprises posts mounted on the frame and being disposed in pairs respectively at the opposite sides of the cylinder to define slots into which said flanges extend.

7. An apparatus for belling pipe comprising a frame, means on said frame forming a vertical guide, a planar faceplate circular about an axis, bracket means fastened to said faceplate and vertically movable in said guide, a plurality of slips, means for mounting said slips on said faceplate for movement radially of said faceplate, means on the radially outer ends of said slips for engaging a pipe, means on the radially inner ends of said slips for engaging a driver cone concentric with said axis and engaging said inner ends, a hydraulic cylinder fastened to said faceplate, a piston rod mounted in said cylinder concentric with said axis and connected to said driver cone, a piston disposed in said cylinder and on said rod, means for vertically moving said faceplate and said cylinder relative to said frame, a source of hydraulic pressure fluid on said frame, and means including a flexible member for connecting said source to said cylinder.

8. An apparatus as in claim 7 and including a loose ring encompassing the radially outer ends of said slips in the path of movement thereof and effective as a stop for said slips.

References Cited in the file of this patent
UNITED STATES PATENTS

| | | |
|---|---|---|
| 524,324 | Higgins | Aug. 14, 1894 |
| 1,039,948 | Hunter | Oct. 1, 1912 |
| 1,105,094 | Mowat | July 28, 1914 |
| 1,389,036 | Edwards | Aug. 30, 1921 |
| 1,535,022 | Jenkins | Apr. 21, 1925 |
| 1,895,732 | Rosenkranz | Jan. 31, 1933 |
| 2,154,402 | Kahn | Apr. 11, 1939 |
| 2,221,539 | Gehret | Nov. 12, 1940 |
| 2,357,123 | Maxwell | Aug. 29, 1944 |
| 2,461,565 | Morrill | Feb. 15, 1949 |
| 2,557,722 | Brauchler | June 19, 1951 |
| 2,623,570 | Resser | Dec. 30, 1952 |
| 2,667,136 | Reichl | Jan. 26, 1954 |
| 2,672,175 | Howard | Mar. 16, 1954 |
| 2,780,271 | Ewart | Feb. 5, 1957 |
| 2,789,541 | Gaspar | Apr. 23, 1957 |